United States Patent
Wagner et al.

(10) Patent No.: US 11,318,660 B2
(45) Date of Patent: May 3, 2022

(54) PERMANENT TOOLING FOR COMPOSITE COIL SPRING COMPRESSION MOLDING

(71) Applicant: Ford Global Technologies, LLC, Dearborn, MI (US)

(72) Inventors: David Anthony Wagner, Northville, MI (US); Jeff Michael Hatt, Livonia, MI (US); Gerald J. Heath, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 187 days.

(21) Appl. No.: 16/682,846

(22) Filed: Nov. 13, 2019

(65) Prior Publication Data

US 2021/0138715 A1  May 13, 2021

(51) Int. Cl.
| | | |
|---|---|---|
| B29C 45/44 | (2006.01) | |
| B29C 53/60 | (2006.01) | |
| B29C 45/40 | (2006.01) | |
| B29C 45/26 | (2006.01) | |
| B29C 45/00 | (2006.01) | |

(Continued)

(52) U.S. Cl.
CPC ............ B29C 53/60 (2013.01); B29C 45/00 (2013.01); B29C 45/2614 (2013.01); B29C 45/40 (2013.01); B29C 45/2602 (2013.01); B29C 45/561 (2013.01); B29L 2031/7742 (2013.01)

(58) Field of Classification Search
CPC ............ B29C 43/02; B29C 2043/3615; B29C 2043/3618; B29C 45/00; B29C 45/03; B29C 45/04; B29C 45/0416; B29C 45/26; B29C 45/2602; B29C 45/40; B29C 53/06
See application file for complete search history.

(56) References Cited

U.S. PATENT DOCUMENTS

| | | | | |
|---|---|---|---|---|
| 4,728,474 A | * | 3/1988 | Beall | ................. B29C 45/38 249/59 |
| 7,442,032 B2 | * | 10/2008 | Tu | .................. B29C 45/332 425/556 |

(Continued)

FOREIGN PATENT DOCUMENTS

| | | |
|---|---|---|
| CN | 107839204 | 3/2018 |
| EP | 2640566 | 7/2014 |
| JP | S5783738 | 5/1982 |

*Primary Examiner* — Joseph S Del Sole
*Assistant Examiner* — Thu Khanh T Nguyen
(74) *Attorney, Agent, or Firm* — Burris Law, PLLC

(57) ABSTRACT

Tooling for use in forming a variable taper component is provided. The tooling includes an inner mandrel and an outer mandrel disposed around the inner mandrel. The inner mandrel includes a master insert defining opposed tapered edge faces, an external surface having a variable taper and a plurality of recesses configured to receive at least a portion of the variable taper component, and a tapered internal surface. The inner mandrel also includes a plurality of interlocking pieces arranged concentrically around the master insert, and a tapered inner sleeve disposed against the tapered internal surfaces of the plurality of interlocking pieces and the master insert. The outer mandrel defines a corresponding plurality of recesses configured to receive at least a portion of the variable taper component, wherein a maximum width of the interlocking pieces and the master insert is smaller than a minimum width of ends of the variable taper component.

20 Claims, 12 Drawing Sheets

(51) Int. Cl.
   *B29L 31/00*       (2006.01)
   *B29C 45/56*       (2006.01)

(56) References Cited

U.S. PATENT DOCUMENTS 8,939,438 B2 *  1/2015  Kempf .................... B29C 45/44
                                                    267/166
9,022,777 B2     5/2015  Jang et al.

* cited by examiner

PERMANENT TOOLING FOR COMPOSITE COIL SPRING COMPRESSION MOLDING

FIELD

The present disclosure relates to tooling, and more specifically to tooling for forming variable taper components such as coil springs.

BACKGROUND

The statements in this section merely provide background information related to the present disclosure and may not constitute prior art.

Most commercially available tooling for variable taper components, such as composite coil springs, are destroyed after forming the variable taper component in order to remove the variable taper component from the trapped tooling. For example, and referring to FIG. 1, a variable taper composite coil spring 10 is shown, which includes a smaller diameter portion 12 at each end and a larger diameter portion 14 in the center. An inner mandrel (not shown) used to form this variable taper composite coil spring 10 is then "locked" inside after the variable taper composite coil spring 10 is formed/cured. Accordingly, the inner mandrel must be destroyed in order to remove the variable taper composite coil spring 10 from the inner mandrel. The inner mandrel is then remanufactured to produce each additional spring, which is costly and time consuming.

Other commercially available tooling uses a bismuth core mandrel that is melted out of the variable taper component after forming and then recast after each variable taper component is produced. This process greatly increases the part cost for each variable taper component.

The present disclosure addresses these issues with variable taper components, among other issues related to tooling for variable taper components, such as composite coil springs.

SUMMARY

In one form of the present disclosure, tooling for use in forming a variable taper component is provided. The tooling comprises an inner mandrel comprising a master insert defining opposed tapered edge faces, each opposed tapered edge face defining at least one locking feature, an external surface having a variable taper and a plurality of recesses configured to receive at least a portion of the variable taper component, and a tapered internal surface. The inner mandrel further comprises a plurality of interlocking pieces arranged concentrically around the master insert, each interlocking piece defining opposed tapered edge faces, one of the opposed tapered edge faces defining at least one locking feature and another of the opposed tapered edge faces defining at least one receiving feature to engage the at least one locking feature of an adjacent interlocking piece, an external surface defining a variable taper and a plurality of recesses configured to receive at least a portion of the variable taper component, and a tapered internal surface. Additionally, the inner mandrel comprises a tapered inner sleeve disposed against the tapered internal surfaces of the plurality of interlocking pieces and the master insert. The tooling further comprises an outer mandrel disposed around the inner mandrel, the outer mandrel defining a corresponding plurality of recesses configured to receive at least a portion of the variable taper component, wherein a maximum width of each of the interlocking pieces and the master insert is smaller than a minimum width of end portions of the variable taper component, and a central portion of the variable taper component is wider than the end portions.

In variations of this tooling, the opposed tapered edge faces of the master insert and the plurality of interlocking pieces are normal to an external surface of the central portion of the variable taper component, the locking feature is a linear tab and the receiving feature is a linear slot, the locking feature is a T-shaped tab and the receiving feature is a T-shaped slot, the locking feature and the receiving feature are magnetic, the variable taper is continuously variable along end portions of the tooling and is constant along a central portion of the tooling, the plurality of recesses in the master insert, the plurality of interlocking pieces, and the outer mandrel define a variable taper helix, the number of the plurality of interlocking pieces is four (4), the outer mandrel defines at least two (2) pieces, the tapered inner sleeve further comprises a removal feature, the at least one locking feature of the master insert and the plurality of interlocking features define a pitch that is equal to a pitch of the variable taper component.

In another variation of this tooling, a top member is disposed above the master insert and the plurality of interlocking pieces, the top member defining a locking feature and at least one of the plurality of interlocking pieces further defining a receiving feature disposed at an upper portion that engages the receiving feature of the top member.

In another form of the present disclosure, an inner mandrel for forming variable taper component is provided. The inner mandrel comprises a master insert defining opposed tapered edge faces, each tapered edge face defining at least one locking feature, an external surface having a variable taper and a plurality of recesses configured to receive at least a portion of the variable taper component, and a tapered internal surface. The inner mandrel further comprises a plurality of interlocking pieces arranged concentrically around the master insert, each interlocking piece defining opposed tapered edge faces, one of the opposed tapered edge faces defining at least one locking feature and another of the opposed tapered edge faces defining at least one receiving feature to engage the at least one locking feature of an adjacent interlocking piece, an external surface defining a variable taper and a plurality of recesses configured to receive at least a portion of the variable taper component, and a tapered internal surface. Additionally the inner mandrel comprises a tapered inner sleeve disposed against the tapered internal surfaces of the plurality of interlocking pieces and the master insert, wherein a maximum width of each of the interlocking pieces and the master insert is smaller than a minimum width of an end portion of the variable taper component, and a central portion of the variable taper component is wider than the end portions.

In a variation of this inner mandrel, a top member is disposed above the master insert and the plurality of interlocking pieces, the top member defining a locking feature and at least one of the plurality of interlocking pieces further defining a receiving feature disposed at an upper portion that engages the receiving feature of the top member.

In another variation of this inner mandrel, the tapered inner sleeve further comprises a removal feature.

In yet another form of the present disclosure, a method of forming a variable taper component is provided. The method comprises placing a variable taper component preform around the inner mandrels as described herein and forming a variable taper component from the variable taper component preform.

In a variation of this method, prior to the forming step, an outer mandrel is placed around the variable taper component preform and the inner mandrel, the outer mandrel defining a corresponding plurality of recesses configured to receive at least a portion of the variable taper component preform. This variation may further comprise injecting a material into the recesses of the inner mandrel and the outer mandrel, wherein the forming step comprises injection molding.

In another form of this method, the forming step comprises compression molding. Additionally, a composite coil spring, among other variable taper components, is formed according to the methods of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
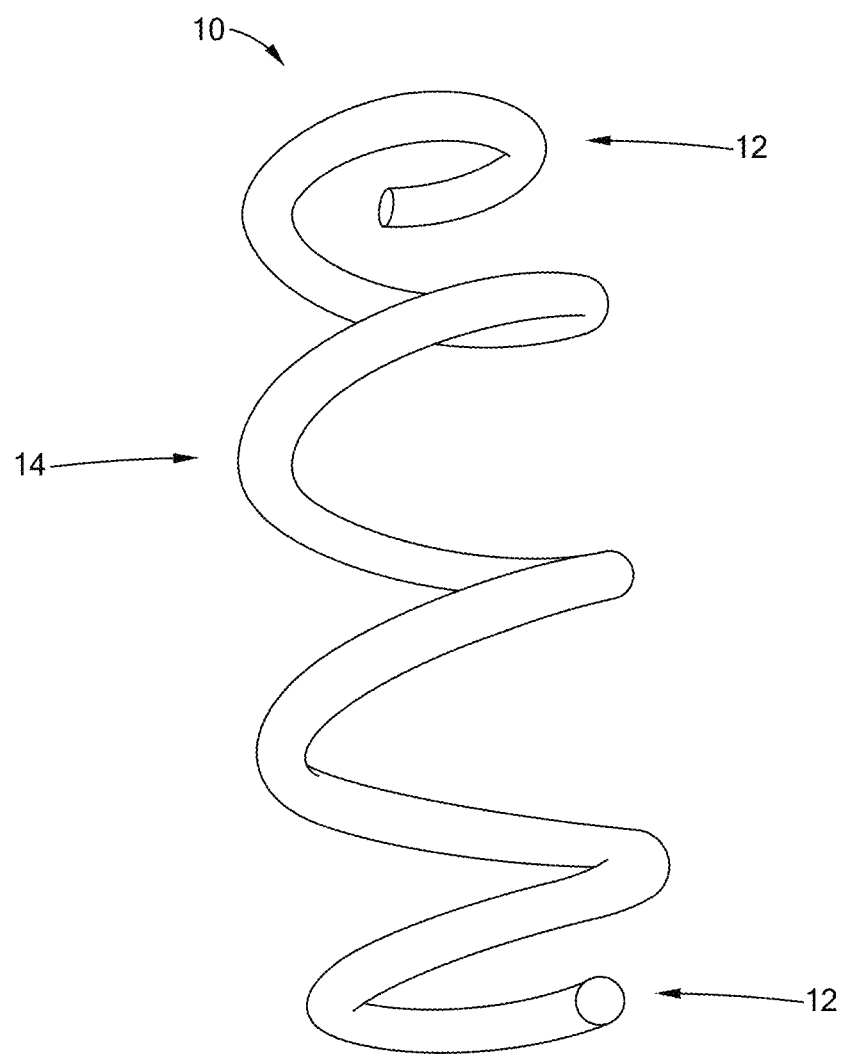
FIG. 1 is a perspective view of a variable taper composite coil spring according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
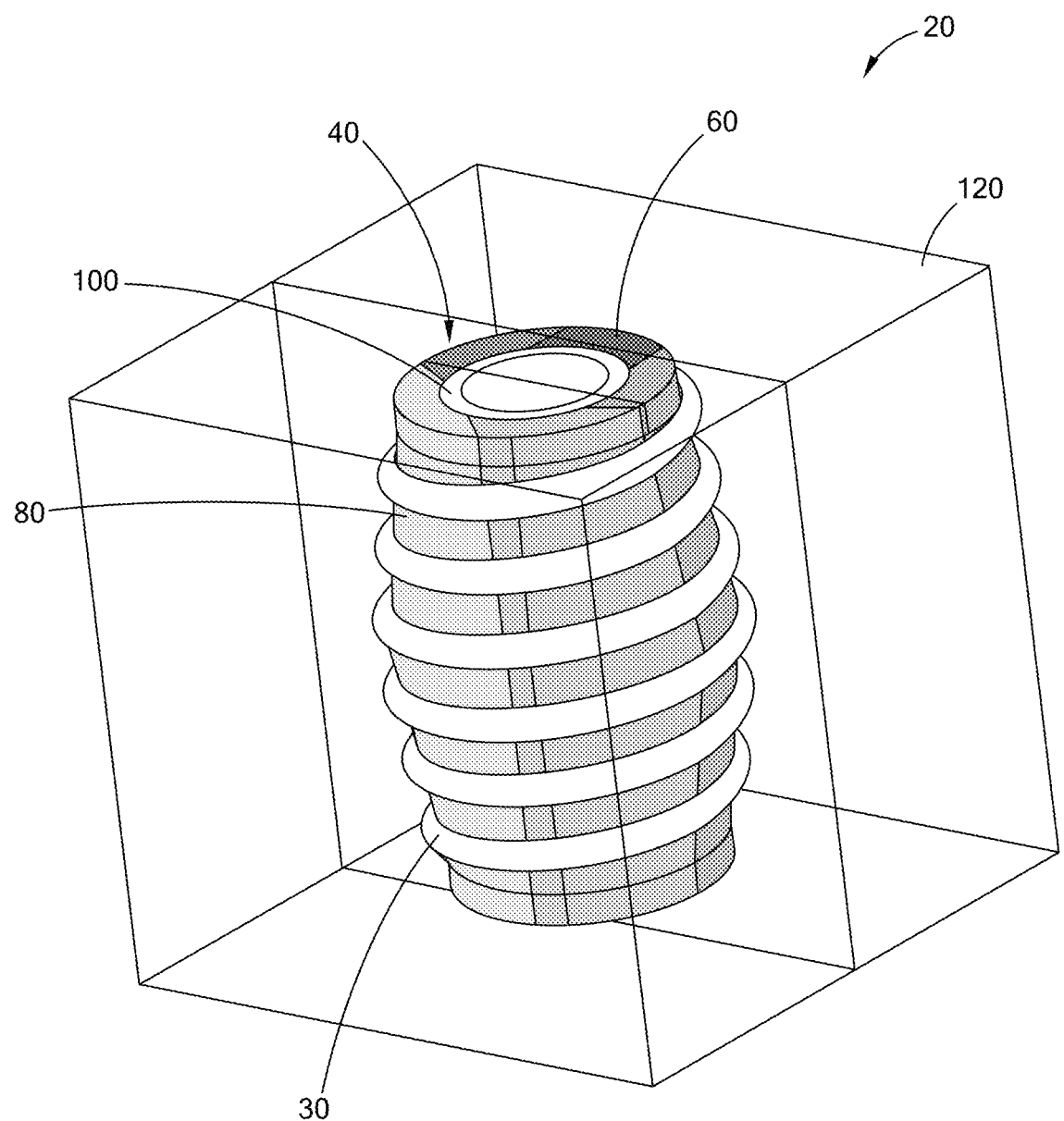
FIG. 2 is a perspective view of tooling for forming a variable taper component constructed according to the teachings of the present disclosure.
Figure 3:
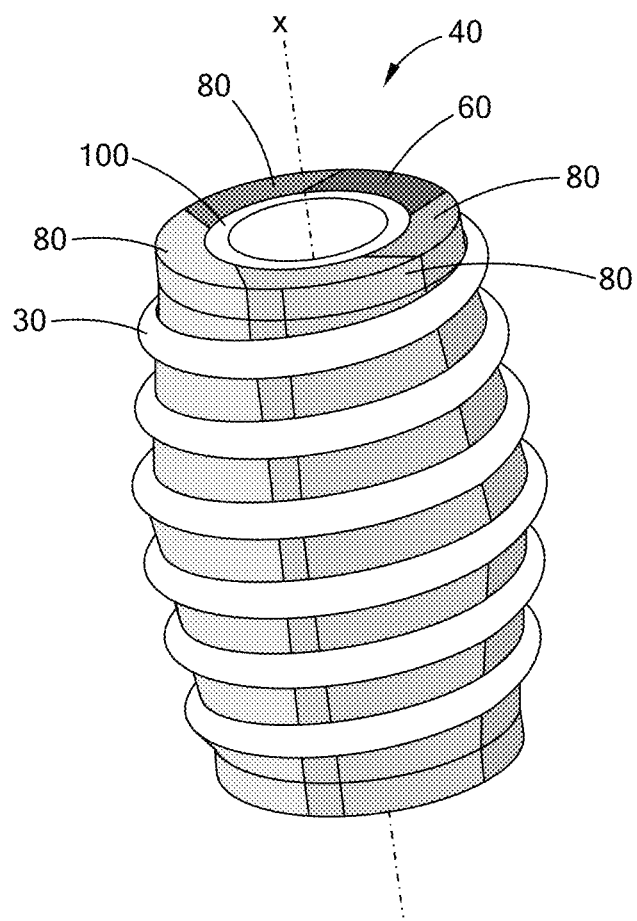
FIG. 3 is a perspective view of an inner mandrel and a variable taper component constructed according to the teachings of the present disclosure.

Referring to FIGS. 2 through 4, tooling 20 for use in forming a variable taper component 30 is shown. The tooling 20 generally comprises an inner mandrel 40 comprised of several pieces, which are described in greater detail below, and in some forms includes an outer mandrel 120.

The inner mandrel 40 comprises a master insert 60, a plurality of interlocking pieces 80, and a tapered inner sleeve 100. As shown, the plurality of interlocking pieces 80 are arranged concentrically around the master insert 60, and each of the components of the inner mandrel 40 are designed to be assembled and disassembled in a specific order so that they may be reused for each subsequent forming operation to produce the variable taper component 30, which is described in greater detail below.

Referring first to FIGS. 5A-5G, the master insert 60 is illustrated in greater detail. The master insert 60 defines opposed tapered edge faces 62, an external surface 66, and a tapered internal surface 72. Each opposed tapered edge face 62 defines at least one locking feature 64, which is configured to engage a corresponding receiving feature in the adjacent interlocking pieces, which is illustrated and described in greater detail below. Although a total of four (4) locking features 64 are shown, two (2) on each opposed tapered edge face 62, it should be understood that any number of locking features may be employed, and in a number of locations besides those illustrated, while remaining within the scope of the present disclosure.

The external surface 66 includes a variable taper 68 (represented by an offset phantom profile in FIG. 5E) as shown and a plurality of recesses 70 configured to receive at least a portion of the variable taper component 30. The variable taper 68 is relative to a longitudinal axis X of the inner mandrel 40 and should be construed to mean that the geometry, or profile, of the external surface 66 increases and decreases along the longitudinal axis X. Further, it should be understood that the variable taper need not be symmetrical about a central portion of the inner mandrel 40 as shown herein and may further be continuously variable or have zones having the same taper transitioning to zones having a different taper while remaining within the scope of the present disclosure. In one form, the taper is continuously variable from the center portion to the end portions while remaining constant along a central portion of the tooling 20.

Generally, the variable taper 68 of the external surface 66 corresponds to the geometry of the variable taper component 30 being formed from the tooling 20, which has smaller end portions and a larger center portion as previously described.

Referring now to FIG. 4A and FIGS. 6A-6F, one of the interlocking pieces 80 is shown in greater detail. Each interlocking piece 80 defines opposed tapered edge faces 82, an external surface 88, and a tapered internal surface 94. One of the opposed tapered edge faces 82 of each interlocking piece 80 defines at least one locking feature 84, and another of the opposed tapered edge faces 82 defines at least one receiving feature 86 to engage the at least one locking feature 84 of an adjacent interlocking piece 80. Similar to the master insert 60 as described above, although a total of two (2) locking features 84 are shown with two (2) corresponding receiving features 86 on each interlocking piece 80, it should be understood that any number of locking features and receiving features may be employed, and in a number of locations besides those illustrated, while remaining within the scope of the present disclosure.

The external surface 88 defines a variable taper 90 (represented by an offset phantom profile in FIG. 6B) and a plurality of recesses 92 configured to receive at least a portion of the variable taper component 30. Notably, due to the plurality of recesses 92 configured to receive the variable taper component 30 and the tapered internal surface 94, each interlocking piece 80 of inner mandrel 40 is unique.

Generally, each of the opposed tapered edge faces 62 of master insert 60 and the opposed tapered edge faces 82 of the interlocking pieces 80 are normal to an external surface of a central portion 34 of the variable taper component 30 for ease of removal, which is illustrated and described in greater detail below. Further, a maximum width of each of the interlocking pieces 80 and the master insert 60 is smaller than a minimum width of end portions 32 of the variable taper component 30, also for ease of removal. Additionally, at least one locking feature 64 of the master insert 60 and at least one locking feature 84 of the plurality of interlocking features 80 define a pitch that is equal to a pitch of the variable taper component. In other words, the locking features 64/84 are at angle relative to each other across the master insert 60 and the interlocking pieces 80 that matches the angle of the variable taper component, in one form of the present disclosure.

Now referring back to FIG. 4A, the tapered inner sleeve 100 in one form is hollow and generally defines a portion of a geometrical cone. However, it should be understood that the tapered inner sleeve 100 could be hollow or solid, and could further include a removal feature as described in greater detail below. The external surface of the tapered inner sleeve 100 is generally configured to mate to the tapered internal surfaces 72 and 94 of the master insert 60 and interlocking pieces 80, respectively. Further, the tapered inner sleeve has a wider proximal end portion 102 and a narrower distal end portion 104, thus forming the taper.

Figure 4A:
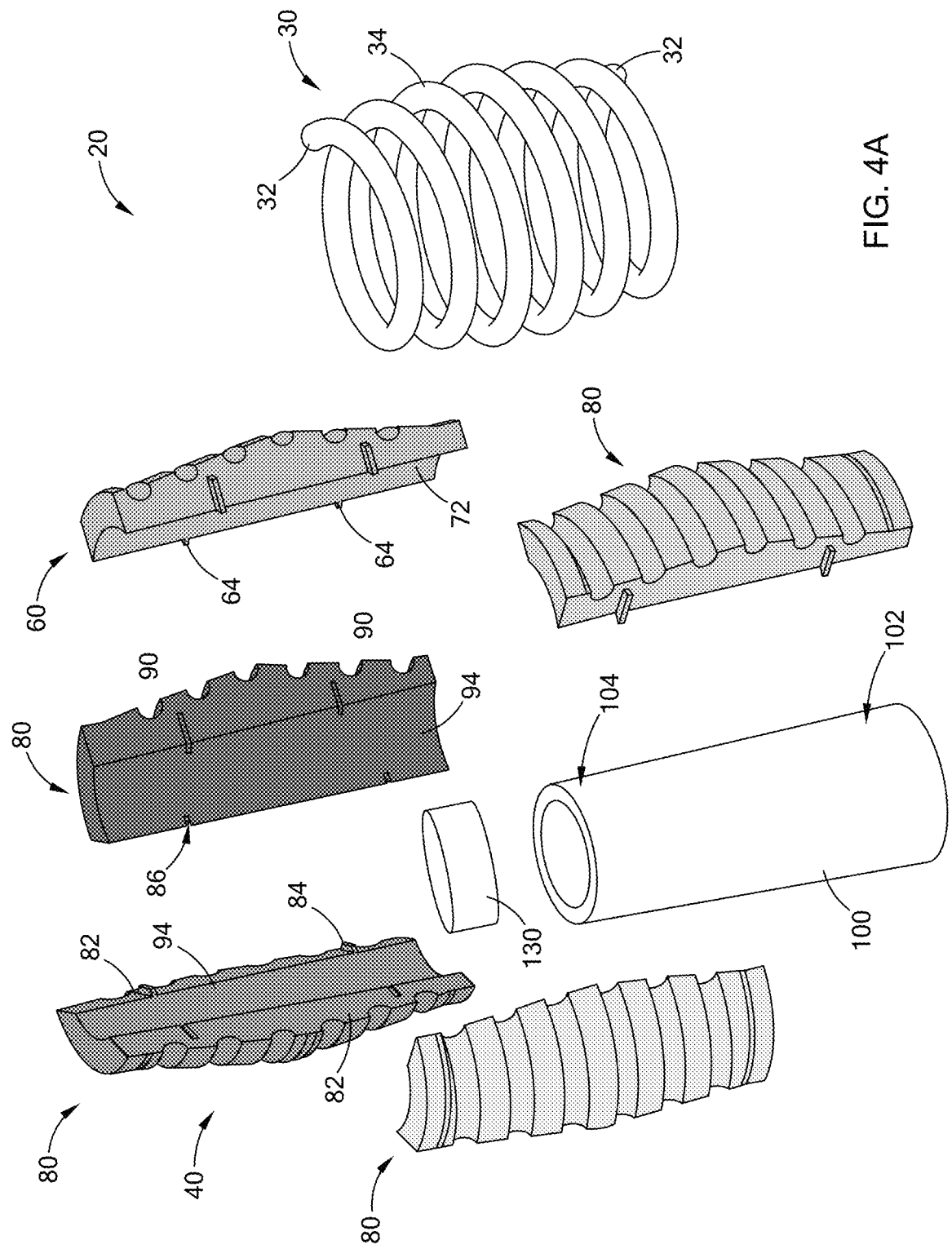
FIG. 4A is an exploded view of FIG. 3.
Figure 4B:
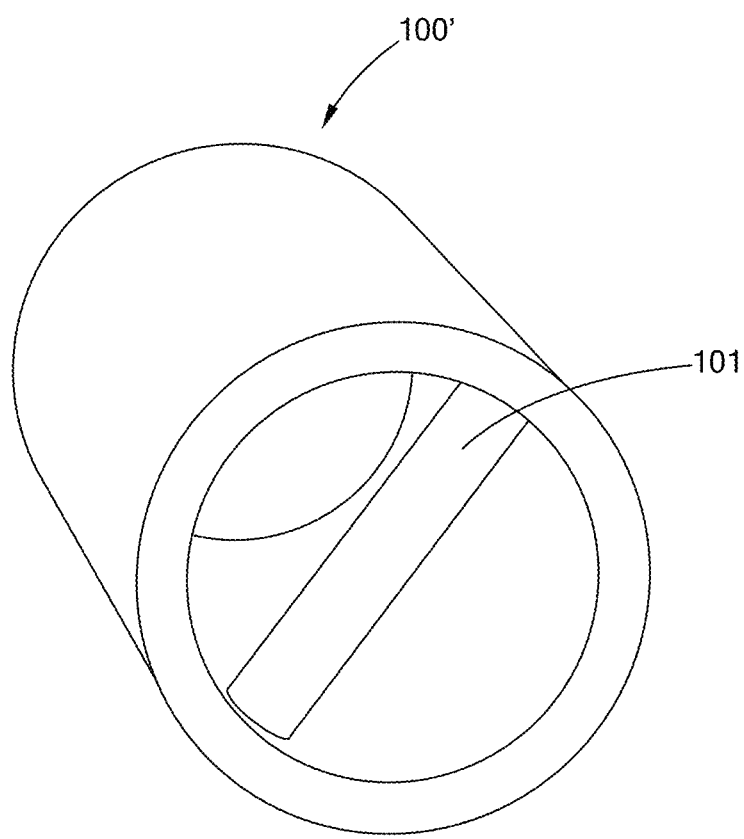
FIG. 4B is a perspective view of an alternate form of the tapered inner sleeve constructed in accordance with the teachings of the present disclosure.

Referring to FIG. 4B, in an alternate form, the tapered inner sleeve 100' includes a removal feature 101, which is configured to assist in removing or inserting the tapered inner sleeve 100 within the assembled master insert 60 and plurality of interlocking pieces 80. In this form, the removal feature 101 is a handle that extends across and interior portion of the tapered inner sleeve 100, which can be grasped by an operator or a machine/robot. It should be understood that this particular handle configuration is merely exemplary, and a wide variety of removal features may be employed while remaining within the scope of the present disclosure.

Figure 4C:
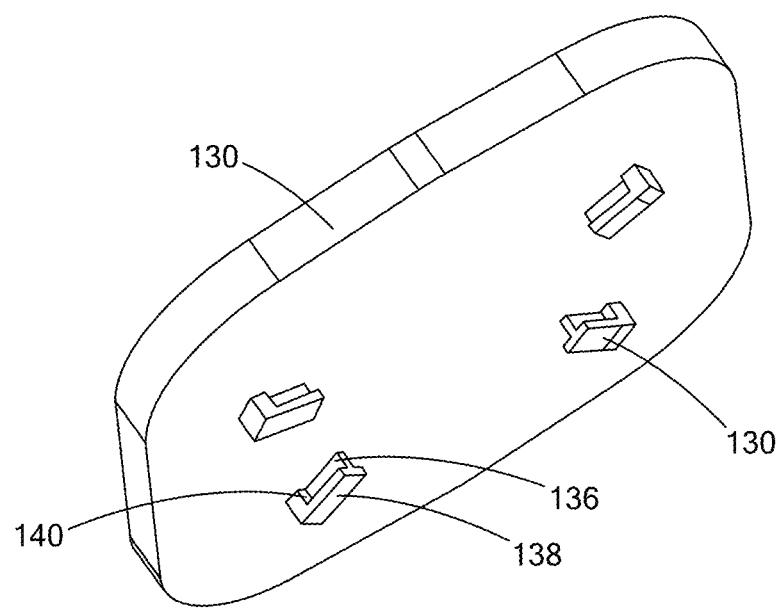
FIG. 4C is a perspective view of the underside of an alternate top member constructed in accordance with the teachings of the present disclosure.
Figure 4D:
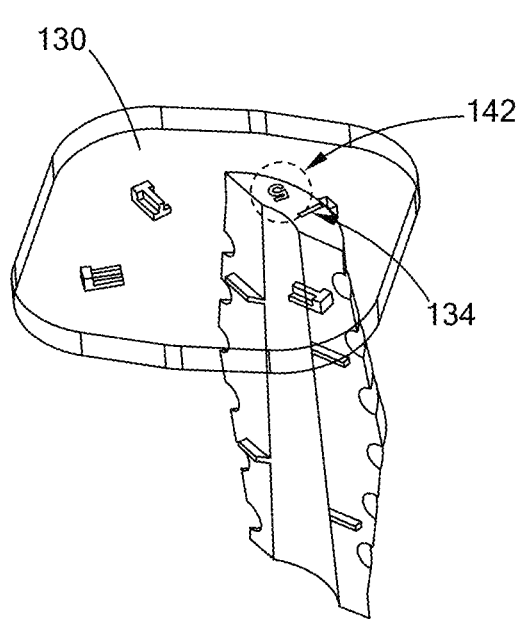
FIG. 4D is a perspective view of the top member of FIG. 4C engaging an interlocking piece and constructed in accordance with the teachings of the present disclosure.
Figure 4E:
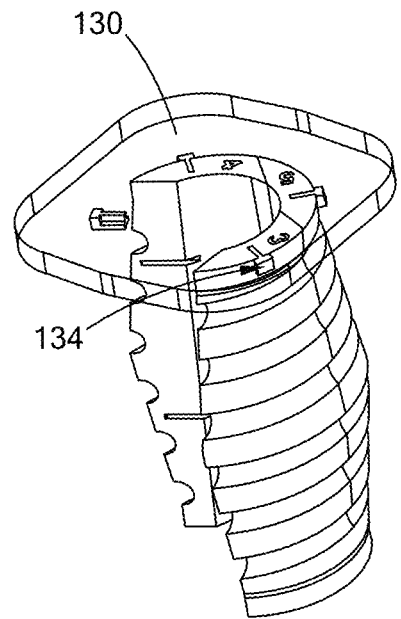
FIG. 4E is a perspective view of the top member of FIG. 4C engaging three (3) interlocking pieces and constructed in accordance with the teachings of the present disclosure.
Figure 5A:
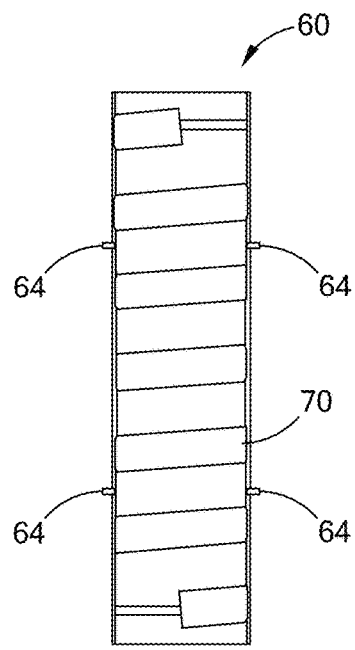
FIG. 5A is a side view illustrating an external portion of a master insert of tooling constructed in accordance with the teachings of the present disclosure.
Figure 5B:
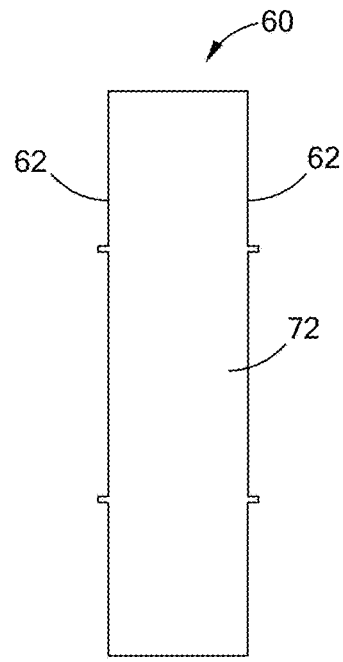
FIG. 5B is a side view illustrating an internal portion of the master insert of FIG. 5A.
Figure 5C:
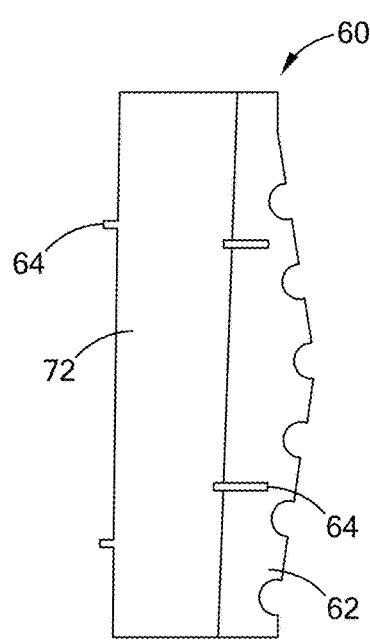
FIG. 5C is a rotated side view of the master insert of FIG. 5A.
Figure 5D:
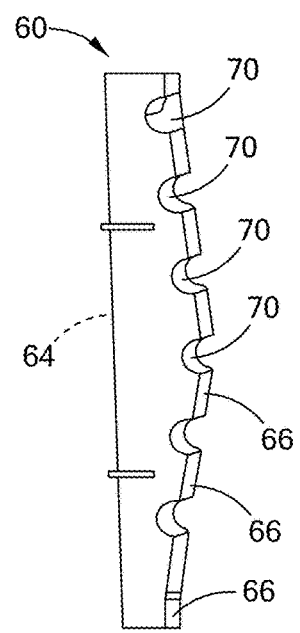
FIG. 5D is another rotated side view of the master insert of FIG. 5A.
Figure 5E:
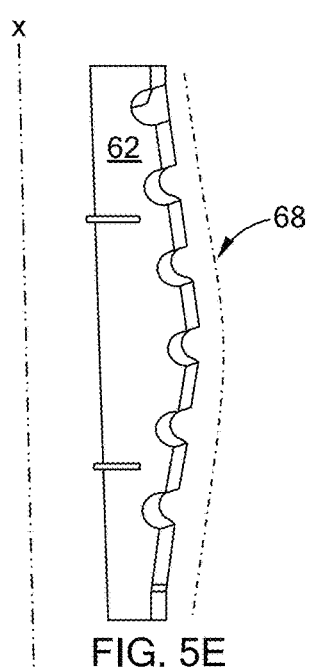
FIG. 5E is the same view as FIG. 5D, illustrating a variable taper of an external surface of the master insert of FIG. 5A.
Figure 5F:
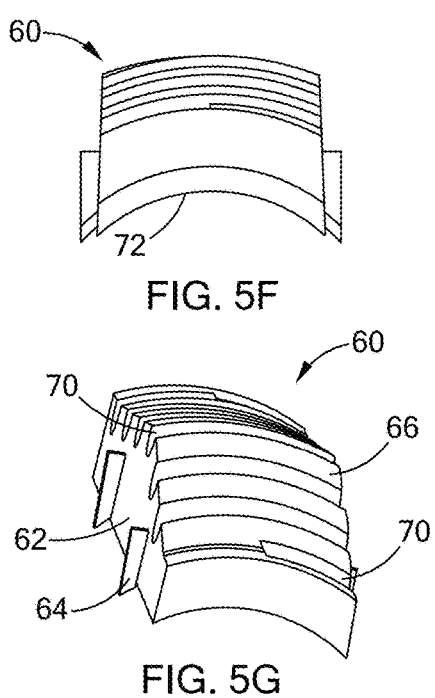
FIG. 5F is a top view of the master insert of FIG. 5A.
Figure 5G:
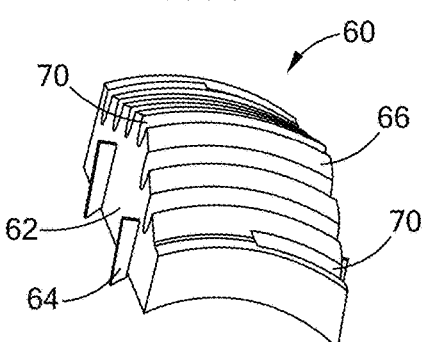
FIG. 5G is a perspective top view of the master insert of FIG. 5A.
Figure 6A:
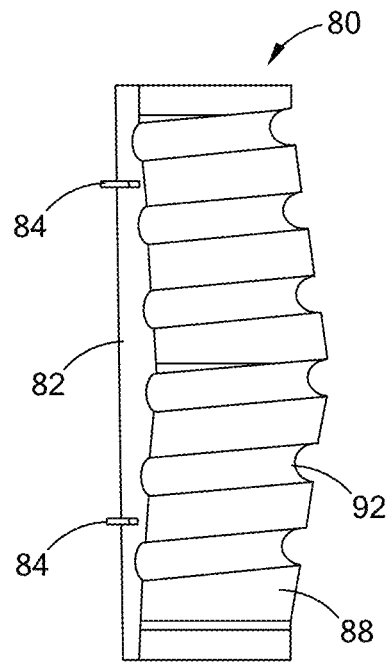
FIG. 6A is a rotated side view of an interlocking piece constructed in accordance with the teachings of the present disclosure.
Figure 6B:
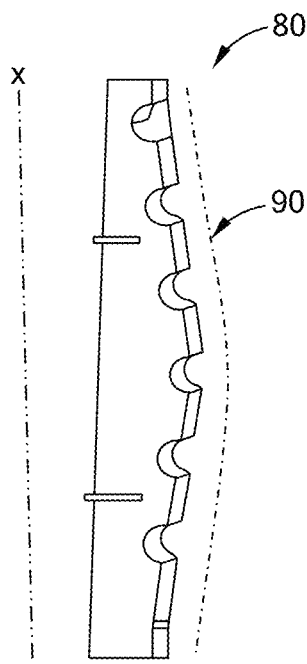
FIG. 6B is another rotated side view of the interlocking piece of FIG. 6A.
Figure 6C:
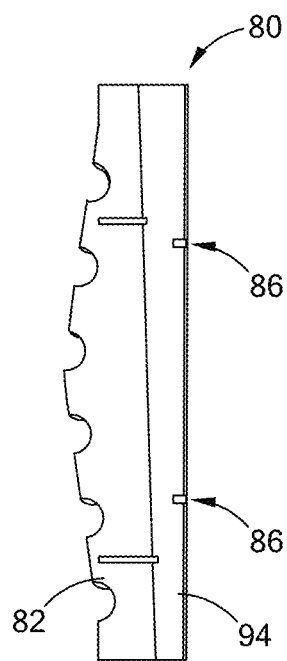
FIG. 6C is another rotated side view of the interlocking piece of FIG. 6A.
Figure 6D:
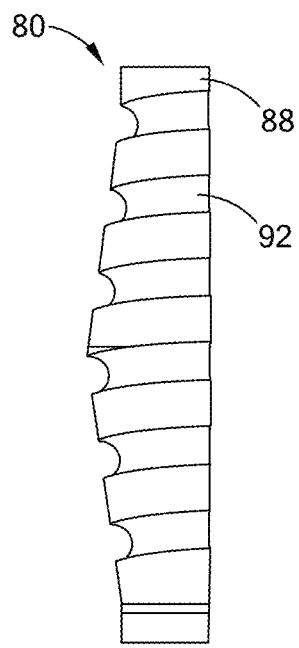
FIG. 6D is a side view of the interlocking piece of FIG. 6A.
Figure 6E:
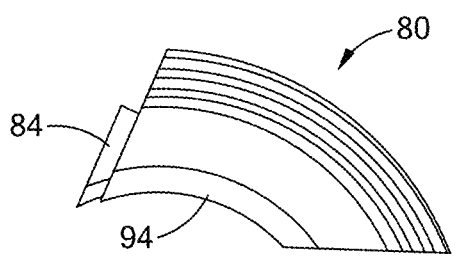
FIG. 6E is a top view of the interlocking piece of FIG. 6A.
Figure 6F:
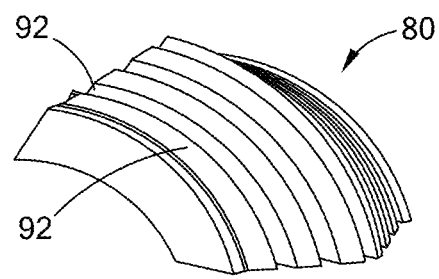
FIG. 6F is a top perspective view of the interlocking piece of FIG. 6A.

Referring now to FIGS. 4C-4E, in another alternate form, a top member 130 is disposed above the master insert 60 (not shown) and the plurality of interlocking pieces 80, the top member 130 defining a locking feature 132 and at least one of the plurality of interlocking pieces 80 further defining a receiving feature 134 disposed at an upper portion that engages the locking feature 132 of the top member 130. (Only one (1) interlocking piece 80 is shown in FIG. 4D and only three (3) interlocking pieces are shown in FIG. 4E for purposes of clarity). The locking feature 132 in this form defines a center rail 136 on a platform 138, and a rear wall 140. With this configuration of a locking feature 132, the center rail 136 provides circumferential positioning, the platform 138 provides axial positioning, and the rear wall 140 provides radial positioning for the respective interlocking piece 80. With this alternate top member 130, the individual pieces/components of the inner mandrel 40 can be more securely locked together.

It should be understood that the specific locking feature 132 illustrated and described herein is merely exemplary, and thus other locking features may be employed while remaining within the scope of the present disclosure. Also, it should be understood that the locking features and receiving features illustrated and described throughout may be interchanged and placed on either of the adjacent components being locked together.

As further shown in FIGS. 4D and 4E, an alternate marking indicia 142 may be provided on components of the inner mandrel 40. For example, a numbering system can be used on each of the master insert 60 and the interlocking pieces 80 (shown with the numerals "3" and "4" and "5") to assist an operator or machine vision system as to which pieces should be assembled and disassembled in which particular order.

Generally, to assemble the inner mandrel 40, each of the interlocking pieces 80 are engaged with each other first, and the master insert 60 is then slid into place via the locking features 84 and receiving features 86. The tapered inner sleeve 100 is then slid into the center of the inner mandrel 40, and by virtue of its taper, forces each of the interlocking pieces 80 and the inner mandrel 40 together in an interlocking fashion.

Figure 7A:
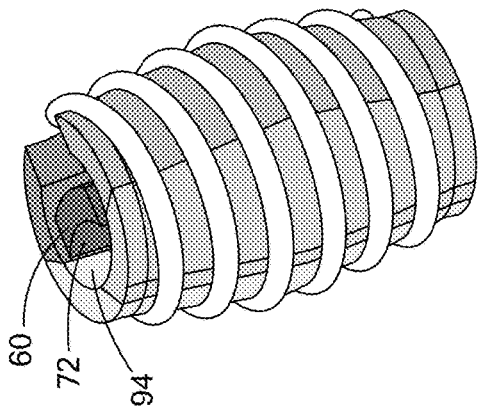
FIGS. 7A through 7L illustrate a sequence of disassembling and removing an inner mandrel from a variable taper component according to the teachings of the present disclosure.
Figure 7B:
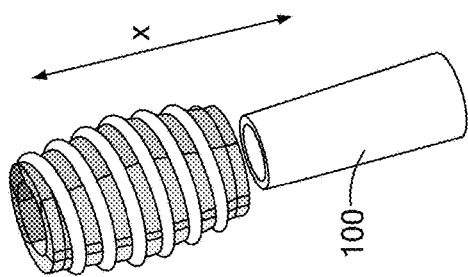
Figure 7C:
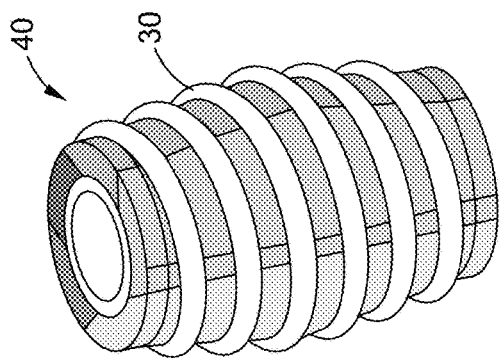
Figure 7D:
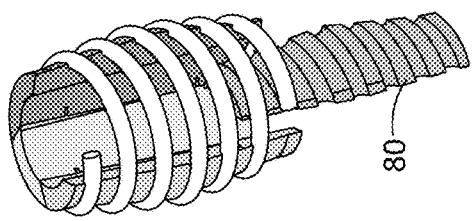

Referring now to FIGS. 4 and 7A through 7L, the inner mandrel 40 is configured to be disassembled and reused after forming a variable taper component 30. In FIG. 7A, the variable taper component 30 has been formed around the inner mandrel 40. After the variable taper component 30 is formed, as shown in FIG. 7B, the tapered inner sleeve 100 is translated (along the longitudinal axis X) or pulled out of the center of the inner mandrel 40. Since the tapered inner sleeve 100 presses against tapered internal surfaces 72 and 94, the removal of tapered inner sleeve 100 allows the master insert 60 to move. Accordingly, in FIG. 7C, the master insert 60 is moved inwardly, away from the variable taper component 30 and towards the center of the inner mandrel 40, and the locking features 64 slidably decouple from receiving features 86 of the adjacent interlocking pieces. As shown in FIG. 7D, master insert 60 can then be removed, or pulled out from the center of the inner mandrel 40.

Figure 7E:
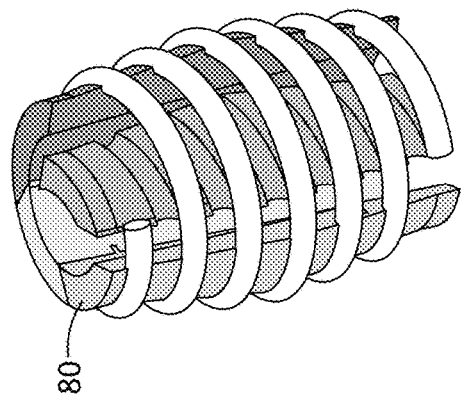
Figure 7F:
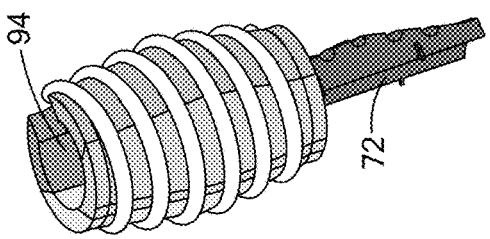
Figure 7I:
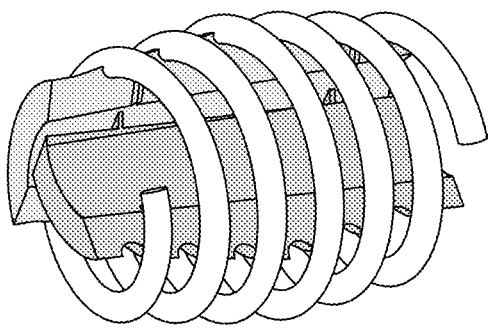
Figure 7L:
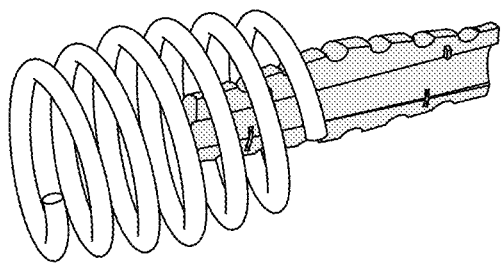
Figure 7H:
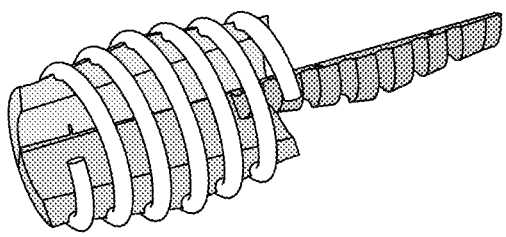
Figure 7K:
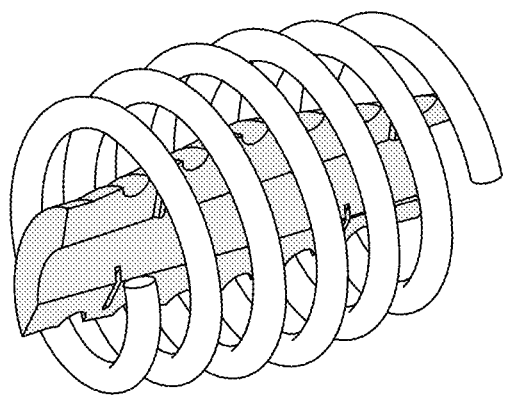
Figure 7G:
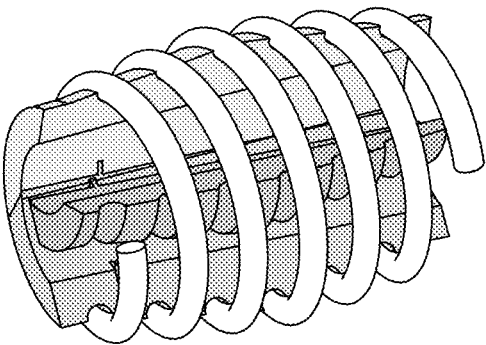
Figure 7J:
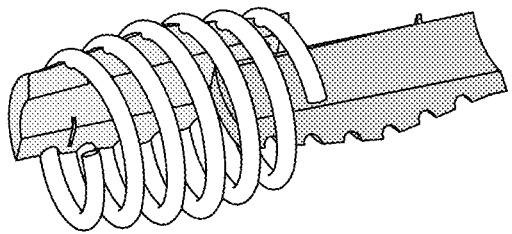

Because the master insert 60 couples to opposed tapered edge faces 82 and receiving features 86 of adjacent interlocking pieces 80, the removal of the master insert 60 then allows at least one interlocking piece 80 to move. As shown in FIG. 7E, locking features 84 of one interlocking piece can be slidably decoupled from receiving features 86 of an adjacent interlocking piece 80, and the interlocking piece 80 can then be moved inwardly, away from the variable taper component 30 and towards the center of the inner mandrel 40, for its removal as shown in FIG. 7F.

This procedure for removing an interlocking piece 80 is then repeated as shown in FIGS. 7G through 7L, so that the remaining interlocking pieces 80 can be removed, thus freeing the variable taper component 30 from the inner mandrel 40. Advantageously, the inner mandrel 40 can be removed and reused in forming another variable taper component 30 without being destroyed.

Figure 8:
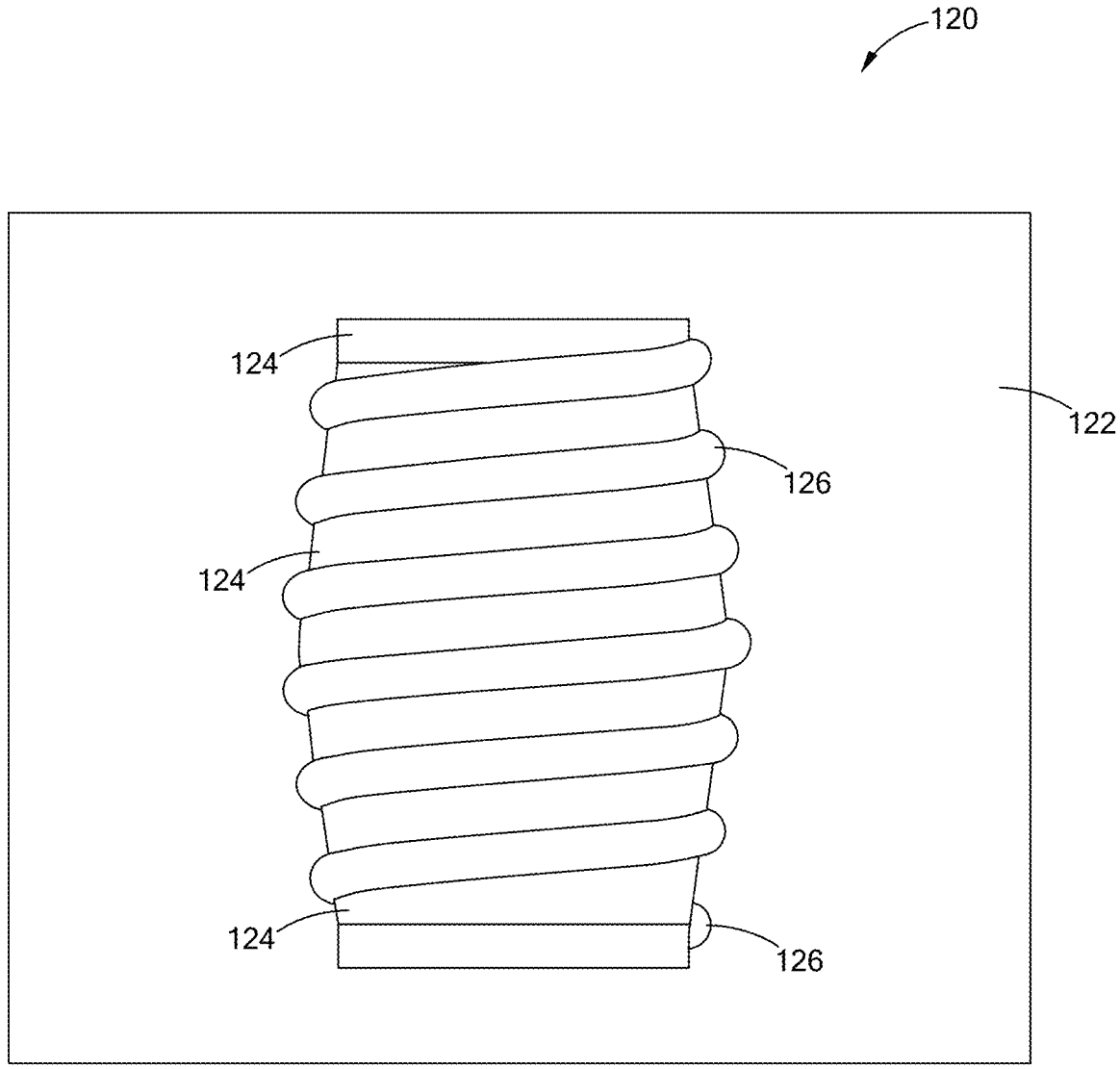
FIG. 8 is a perspective view of a portion of an outer mandrel constructed according to the teachings of the present disclosure.

Referring to FIG. 8, a side view of one half of the outer mandrel 120 from is shown. The outer mandrel 120 comprises a face 122 and an internal surface 124. The internal surface 124 defines a corresponding plurality of recesses 126 configured to receive at least a portion of variable taper component 30. Generally, the internal surface 124 is configured to couple, or conform to the variable taper component 30 and the external geometries of the master insert 60 and interlocking pieces 80. Accordingly, the tooling 20 can be used in a variety of manufacturing operations such as, by way of example, compression molding or injection molding. Although a two-piece outer mandrel 120 is shown herein, it should be understood that any number of pieces, or alternatively a conformal bladder or other tooling design, may be employed for the outer mandrel while remaining within the scope of the present disclosure.

In a compression molding application, the inner mandrel 40 is first assembled, and then a variable taper component preform (not shown) is placed within the recesses 70 and 92 of the master insert 60 and the interlocking pieces 80, respectively. The outer mandrel 120 is then placed around the variable taper component preform and the inner mandrel 40, and this assembly is placed in a compression molding die/tool. After forming, the outer mandrel 120 is removed first, and then the inner mandrel 40 is disassembled as described above. The variable taper component 30 can then be removed for further processing without destroying any tooling.

Similarly, for injection molding, the inner mandrel 40 and the outer mandrel 120 are assembled together (and positioned relative to each other with tooling features not shown), and then this assembly is placed into an injection molding tool. Molten resin, or molten resin with embedded fibers, can then be injected into the recesses 70 and 92 of the master insert 60 and the interlocking pieces 80, respectively, and the recesses 126 of the outer mandrel 120, to form the variable taper component 30. The outer mandrel 120 and inner mandrel 40 are removed as set forth above.

It should be understood that compression molding and injection molding are merely two examples of forming a variable taper component, and other processes are to be considered within the scope of the present disclosure. Further, a variety of part types may be formed using the innovative tooling 20 according to the teachings of the present disclosure. For example, a composite coil spring can be formed according to the teachings herein. The composite coil spring may comprise continuous or discontinuous fibers, which may be glass or carbon by way of example, in a curable resin matrix. The curable resin matrix can be either thermoset or thermoplastic.

Further, as illustrated herein, the plurality of recesses 70/92/126 in the master insert 60, the plurality of interlocking pieces 80, and the outer mandrel 120, respectively, define a variable taper helix in one form of the present disclosure.

The master insert 60, interlocking pieces 80, tapered inner sleeve 100, outer mandrel 120 and components thereof (e.g. locking feature, receiving feature, among others) can be made of any material that can withstand the processing temperatures and pressures when forming the variable taper component 30. As such, a tool steel is contemplated in one form, although other materials such as ceramics (e.g. alumina, carbides graphite, magnetic, nitrides, non-oxide, oxide, sand, silica, zirconia, among others), composites, other metals (e.g. aluminum-based, iron-based, magnetic, nickel-based, titanium-based, among others), polymers and combinations of these materials may comprise the master insert, interlocking pieces, tapered inner sleeve, and outer mandrel. Moreover, different materials can be used for each of the master insert 60, interlocking pieces 80, tapered inner sleeve 100, and outer mandrel 120 while remaining within the scope of the present disclosure.

Figure 9:
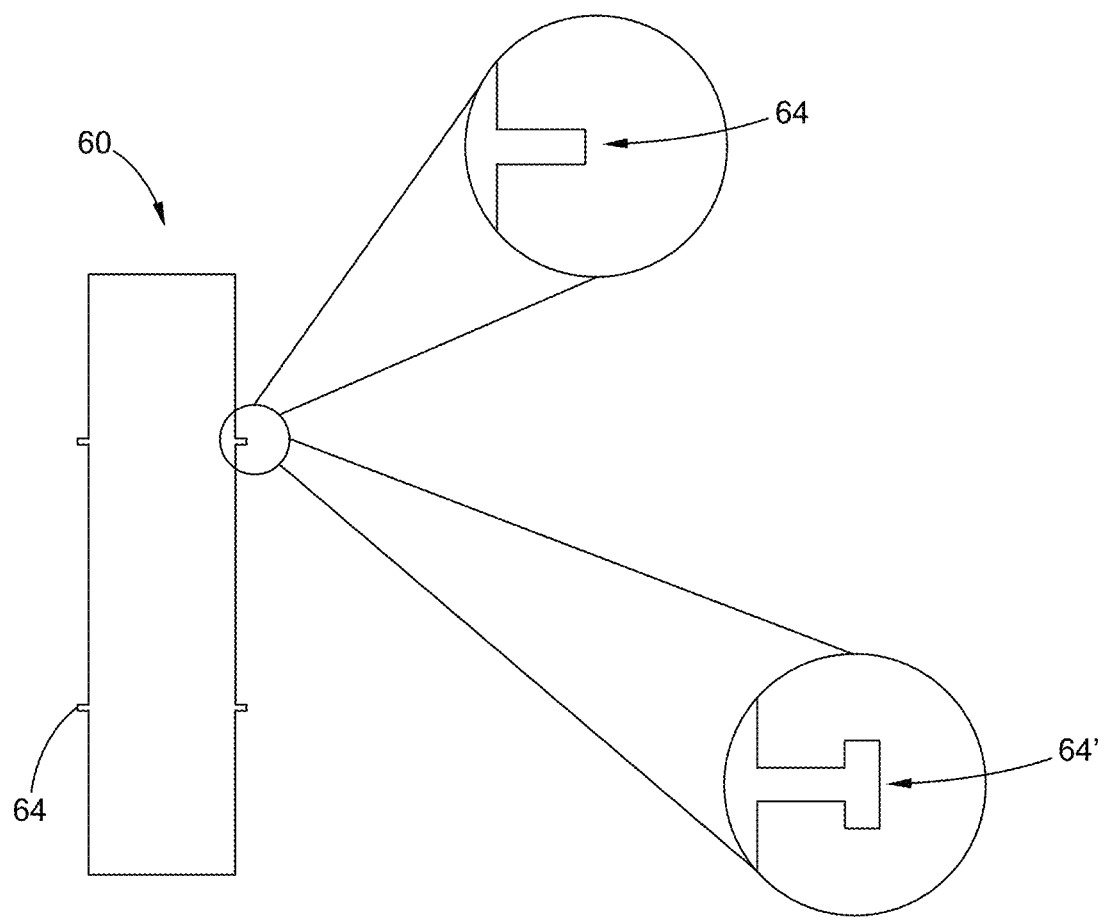
FIG. 9 illustrates alternative locking features of the master insert and/or interlocking pieces constructed according to the teachings of the present disclosure.

Referring now to FIG. 9, alternative forms of locking features 64 of a master insert 60 are shown. It should be understood that these locking features 64, and combinations thereof, may also be used with the locking features 84 of the interlocking pieces 80 while remaining within the scope of the present disclosure. In the first form, the locking feature 64 is a linear tab, while the receiving feature 86 (shown in FIG. 4A) is a linear slot. In an alternate form, the locking feature 64' is a T-shaped tab, while the receiving feature (not shown) is a T-shaped slot. In yet another form, the locking features may be magnetic, whether physical interlocking or exclusively magnetically interlocking. It should be understood that these exemplary variations, among others, may be employed to interlock the components of the inner mandrel 40 while remaining within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. Tooling for use in forming a variable taper component, the tooling comprising:
   an inner mandrel comprising:
   a master insert defining:
   opposed tapered edge faces, each tapered edge face defining at least one locking feature;
   an external surface having a variable taper and a plurality of recesses configured to receive at least a portion of the variable taper component; and
   a tapered internal surface;

a plurality of interlocking pieces arranged concentrically around the master insert, each interlocking piece defining:
opposed tapered edge faces, one of the opposed tapered edge faces defining at least one locking feature and another of the opposed tapered edge faces defining at least one receiving feature to engage the at least one locking feature of an adjacent interlocking piece;
an external surface defining a variable taper and a plurality of recesses configured to receive at least a portion of the variable taper component; and
a tapered internal surface; and
a tapered inner sleeve disposed against the tapered internal surfaces of the plurality of interlocking pieces and the master insert; and
an outer mandrel disposed around the inner mandrel, the outer mandrel defining a corresponding plurality of recesses configured to receive at least a portion of the variable taper component,
wherein a maximum width of each of the interlocking pieces and the master insert is smaller than a minimum width of end portions of the variable taper component, and a central portion of the variable taper component is wider than the end portions.

2. The tooling according to claim 1, wherein the opposed tapered edge faces of the master insert and the plurality of interlocking pieces are normal to an external surface of the central portion of the variable taper component.

3. The tooling according to claim 1, wherein the locking feature is a linear tab and the receiving feature is a linear slot.

4. The tooling according to claim 1, wherein the locking feature is a T-shaped tab and the receiving feature is a T-shaped slot.

5. The tooling according to claim 1, wherein the locking feature and the receiving feature are magnetic.

6. The tooling according to claim 1, wherein the variable taper is continuously variable along end portions of the tooling and is constant along a central portion of the tooling.

7. The tooling according to claim 1, wherein the plurality of recesses in the master insert, the plurality of interlocking pieces, and the outer mandrel define a variable taper helix.

8. The tooling according to claim 1, wherein a number of the plurality of interlocking pieces is four (4).

9. The tooling according to claim 1, wherein the outer mandrel defines at least two (2) pieces.

10. The tooling according to claim 1 further comprising a top member disposed above the master insert and the plurality of interlocking pieces, the top member defining a locking feature and at least one of the plurality of interlocking pieces further defining a receiving feature disposed at an upper portion that engages the receiving feature of the top member.

11. The tooling according to claim 1, wherein the tapered inner sleeve further comprises a removal feature.

12. The tooling according to claim 1, wherein the at least one locking feature of the master insert and the plurality of interlocking features define a pitch that is equal to a pitch of the variable taper component.

13. An inner mandrel for forming variable taper component, the inner mandrel comprising:
a master insert defining:
opposed tapered edge faces, each tapered edge face defining at least one locking feature;
an external surface having a variable taper and a plurality of recesses configured to receive at least a portion of the variable taper component; and
a tapered internal surface;
a plurality of interlocking pieces arranged concentrically around the master insert, each interlocking piece defining:
opposed tapered edge faces, one of the opposed tapered edge faces defining at least one locking feature and another of the opposed tapered edge faces defining at least one receiving feature to engage the at least one locking feature of an adjacent interlocking piece;
an external surface defining a variable taper and a plurality of recesses configured to receive at least a portion of the variable taper component; and
a tapered internal surface; and
a tapered inner sleeve disposed against the tapered internal surfaces of the plurality of interlocking pieces and the master insert,
wherein a maximum width of each of the interlocking pieces and the master insert is smaller than a minimum width of an end portion of the variable taper component, and a central portion of the variable taper component is wider than the end portions.

14. The inner mandrel according to claim 13 further comprising a top member disposed above the master insert and the plurality of interlocking pieces, the top member defining a locking feature and at least one of the plurality of interlocking pieces further defining a receiving feature disposed at an upper portion that engages the receiving feature of the top member.

15. The tooling according to claim 13, wherein the tapered inner sleeve further comprises a removal feature.

16. A method of forming a variable taper component comprising:
placing a variable taper component preform around the inner mandrel according to claim 13; and
forming a variable taper component from the variable taper component preform.

17. The method according to claim 16 further comprising, prior to the forming step, placing an outer mandrel around the variable taper component preform and the inner mandrel, the outer mandrel defining a corresponding plurality of recesses configured to receive at least a portion of the variable taper component preform.

18. The method according to claim 17 further comprising injecting a material into the recesses of the inner mandrel and the outer mandrel, wherein the forming step comprises injection molding.

19. The method according to claim 16, wherein the forming step comprises compression molding.

20. A composite coil spring formed according to the method of claim claim 16.

* * * * *